Dec. 2, 1958           L. R. NESTOR           2,862,806

MOLDED ROTATIVE ABRASIVE ARTICLES AND METHOD OF MAKING

Filed May 2, 1955

INVENTOR.
LEONARD R. NESTOR
BY
Carpenter, Abbott, Coulter & Kinney
ATTORNEYS

United States Patent Office 2,862,806
Patented Dec. 2, 1958

2,862,806

MOLDED ROTATIVE ABRASIVE ARTICLES AND METHOD OF MAKING

Leonard R. Nestor, St. Paul, Minn., assignor to Minnesota Mining & Manufacturing Company, St. Paul, Minn., a corporation of Delaware Application May 2, 1955, Serial No. 505,330

11 Claims. (Cl. 51—295)

The present invention relates to the formation of molded abrasive articles such as abrasive wheels, abrasive rings and the like. More particularly it pertains to the manufacture of accurately balanced abrasive articles of the type mentioned by centrifugal forming methods, to the apparatus employed therein, and to the centrifugally cast abrasive products produced thereby.

The majority of abrasive wheels are presently manufactured by what is known in the art as the "cold press" method. In this method an abrasive mix consisting of abrasive grains and a solid thermosetting pressure-unifiable binder in granular form is added to a mold and subjected therein to a high pressure so as to form a unified uncured wheel blank. The blank is then removed from the mold and fired in an oven to cure the binder. Efficient repetitive use is made of mold equipment in the cold press process since the wheel blank may be cured to a uniform compact article after removal from the mold. Thus rapid production from a single mold is possible even though several hours are required for the complete cure of the binder. Also any volatiles given off during the curing of the binder easily escape from the non-confined blanks. However, the cold press method necessitates the use of an abrasive binder which is a solid, which will unify upon being subjected to pressure and which will not flow during heat cure. The latter characteristic is highly necessary to the production of uniformly shaped wheels where shape-retaining molds are not present during the firing operation.

Liquid abrasive binders may be used in the manufacture of molded abrasive articles. But the use of such binders requires that the abrasive article be cured in a mold. Free removal of volatiles during cure of the binder is prevented as a result of the confinement. Moreover, the use of liquid binders makes the formation of uniform articles difficult. If less than the exact amount of binder necessary to just fill the interstices between the grains in compressed form is used, the topmost abrasive grains in the mold become resin starved, while the lower grains are adequately surrounded by binder. Or, if an excess of binder is used, the non-compressibility of the mixture prevents proper uniform compaction of the abrasive grains. Shrinkage of such binders during cure make the finished article extremely difficult to separate from a cylindrical central core section. Thus, a conical core section must be used to permit separation from the mold. Additional operations are then necessitated in order to form the desired cylindrical center hole.

According to the present invention I am able to manufacture abrasive articles which are fully uniform in any required thickness. Accurate duplication is attained. I may employ any physical form of resinous abrasive binder, including liquid binders. Irrespective of what form of binder is employed, any volatiles are easily removed during cure of the binder. I am able to utilize the shrinkage of the binder to a direct advantage. Further by the methods hereof, abrasive articles are formed which are inherently resistant to radial cracking. However, should it be desired to add reinforcing fibers, the reinforcing may be incorporated within the abrasive articles at substantially any desired position.

Other objects and advantages which are attained by the present invention will be apparent upon reference to the following description, or will be specifically hereinafter pointed out. In the accompanying drawings.

Figure 1:
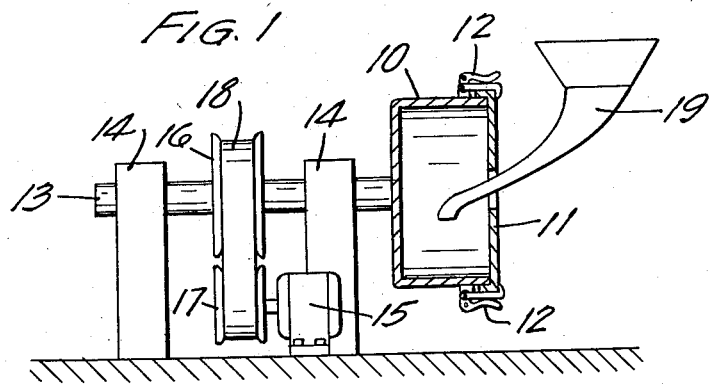
Figure 1 is a schematic elevation view, partially in section, of exemplary centrifugal casting apparatus which may be used in the formation of my novel abrasive products.

In making an abrasive article of the present invention using the apparatus of Figure 1, a mold 10 with cover 11 held thereon in removable leak-proof engagement by clamps 12 is rotated on a stiff shaft 13 supported by rigidly mounted bearings 14. The rotation of the mold 10 is accomplished by means of a motor 15 through pulleys 16 and 17 and drive belt 18.

Abrasive grit and resin binder are distributed uniformly within the mold 10 during rotation thereof by an addition chute 19 which extends into the mold through the central aperture provided in the cover 11. The chute 19 is then withdrawn. The resinous binder may be in liquid or plastic form, or in the form of particulate solid capable of temporarily flowing on heating, or as a coating on the abrasive grains. The chute 19 is then withdrawn, and heat is applied if necessary to soften the binder. The abrasive grain and plastic binder then quickly rearrange or flow to a position of dynamic equilibrium in the rotating mold. The abrasive grains are held by centrifugal forces in packed relation uniformly around the mold against the peripheral wall while the binder, in tending to flow radially outwardly, fills the interstices between the grains. The contents of the mold are then consolidated by the hardening of the binder while the rotation is continued. When hardening is completed, the mold is permitted to come to rest, and the cover 11 is removed by disengaging clamp 12 and the abrasive wheel taken from the mold. Where further curing of the binder is necessary it may be accomplished in an oven.

Novel abrasive articles are obtained from procedures hereof and will be described hereinafter in the following non-limitative specific illustrations of the present invention.

*Example*

| | Grams |
|---|---|
| Epoxide resin ("Bakelite BR–18774") a reaction product of bisphenol A and epichlorohydrin; epoxy number approximately 192 grams per epoxide equivalent and hydroxy number approximately 80 grams per hydroxy equivalent | 220 |
| Metaphenylene diamine | 36 |
| Grit 80 aluminum oxide abrasive grains | 579 |

The abrasive wheel illustrated in Figure 2 was made in the following manner:

The abrasive grains were uniformly added to a centrifugal mold rotating at 1750 R. P. M., the inner surfaces of which had been coated with a silicone mold-release agent. The mold had an inner diameter of 6 inches and an inner width of ¾ inch. The mold cover was provided with a one inch diameter central aperture.

The abrasive binder was prepared by heating the epoxide resin to a temperature of about 250° F. and mixing therewith the accelerator which had also been heated to the same temperature. The fluid mixture, having a useful potlife of about 15 minutes at this temperature, was then poured through the central access opening into the mold containing the previously added abrasive.

As the liquid binder came into contact with the abrasive grains, centrifugal forces cause it to flow outwardly through the interstices between the grains, displacing the air contained therein. The abrasive binder in excess over that necessary to fill the many interstices between the abrasive grains formed a radially inner resin reinforcing ring devoid of abrasive grains at the central portion of the wheel.

Heat was then applied to the rotating mold, by playing a flame directly upon the mold surface, for a period of about 20 minutes to harden and completely cure the binder, at which time the rotation was stopped and the mold allowed to cool. After the front wall had been disengaged from the remainder of the mold, the completed abrasive wheel was easily removed therefrom, the slight shrinkage of the binder during cure having prevented the article from adhering to the peripheral wall while the mold release agent prevented adherence to the lateral walls.

Figure 2:
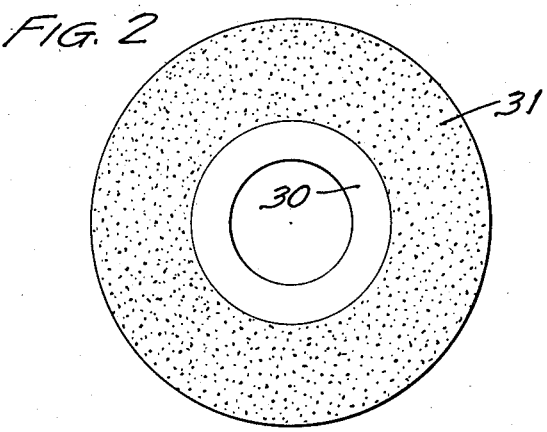
Figure 2 represents an abrasive wheel product made in accordance with the principles of the invention.

The resulting ring-like abrasive article is illustrated in Figure 2. It had a thickness of ¾ inch, an outer diameter of 6 inches and an internal diameter of 1⅝ inches. A radially inner resin reinforcing ring 30 having a radial thickness of ¼ inch was present in the wheel, with the abrasive portion 31 consisting of the outer 1¹⁵⁄₁₆ inches. All of the exposed surfaces of the wheel are seen to be smooth, substantially no abrasive grains being exposed on the surfaces, since the binder had completely filled the exterior interstices. This feature permitted the article to be comfortably handled without abrasion to the hands. However, upon being used in abrading operations, the film of binder on the abrading surface was immediately worn away upon contact with the work leaving exposed the abrasive grains.

Excellent abrading characteristics were exhibited by the abrasive wheel of the preceding example. The wheels were exactly balanced without need of any additional balancing operations. Not only was the rate of cut on mild steel test pieces seen to be high, but surprisingly the wheel also abraded soft metals such as aluminum and brass indefinitely at a rapid rate without becoming filled or glazed. Wheel wear upon abrasion of mild steel test pieces was negligible in 30 minutes of continuous operation. I am not aware of any prior art molded rotative abrasive articles which will interchangeably abrade hard or soft metals without quickly becoming worn out and/or filled or glazed.

In my novel procedure for making abrasive articles centrifugal forces exerted upon the contents of the mold cause the center hole of the abrasive article to be perfectly cylindrically shaped and to be always exactly concentric with respect to the geometric axis without the need of a difficultly removable center-hole forming core. Indeed, such a center section is superfluous if not deleterious to the accurate formation of the abrasive article. I know of no other method of forming abrasive articles employing a binder which is in a flowable state during formation and cure of the article in which the undesirable central core section may be eliminated.

Moreover, as seen in the preceding example, shrinkage of the binder during the cure thereof causes the abrasive article to shrink away from the outer peripheral wall of the mold thus actually facilitating release from the mold.

The clear inner resin ring 30 of the wheel of Figure 2 serves as a reinforcing layer to resist radial cracking of the wheel. Having a greater elasticity than the radially outer abrasive portion of the wheel, the ring acts as an absorbent cushion toward stresses which are applied to the wheel.

Although the inner resin ring is highly desirable in abrasive articles, it is impossible to form such a ring in abrasive wheels made in accordance with known prior art methods. Adding the excess resin in the molds employed in such prior art procedures results in mixing of abrasive grain with the excess resin. Attempts to add uncured resin within a previously formed and cured abrasive wheel are ineffective due to shrinkage of the resinous ring away from the inner surface of the wheel when the ring is cured. On the contrary, the inner ring of the present invention is seen to be free of abrasive particles, and to be firmly affixed to and an integral part of the article.

I have found that reinforcing fibers, such as glass, cotton, synthetics, or a mixture thereof in either continuous or chopped form may be conveniently added to abrasive articles which are formed by my novel methods. Furthermore, such materials, when added, may be incorporated within the structure in substantially any desired position. For example, should it be desired to form an abrasive wheel wherein the radially inner resin ring is reinforced, the reinforcing materials are uniformly added to the mold subsequent to the addition of the abrasive grains and binder while the latter is still in the liquid stage. The reinforcing materials remain in the radial inner ring and will not displace any of the denser abrasive grains. Alternatively, by adding the reinforcing fibers concurrently with the abrasive grains, the fibers become interspersed and retained among the abrasive grains in the abrasive portion of the wheel.

It is to be noted, however, that irrespective of the ratio of binder to abrasive grains employed, or the kind or amount of fillers, extenders and reinforcing added, the abrasive articles formed by the techniques hereof are symmetrically uniform and balanced without necessity of further balancing operations. Although the article may be of a variable structure radially, the components thereof are distributed in a uniform fashion circumferentially.

The methods of the present invention are also suitable for forming abrasive articles which have comparatively small radial thicknesses, such as thin flexible articles and abrasive rims and the like. No change is necessary in the equipment, so as to permit articles of identical outside diameter to have any desired size of center hole to be obtained. Rather, only the quantities of materials added to the mold need be varied.

Figure 3:
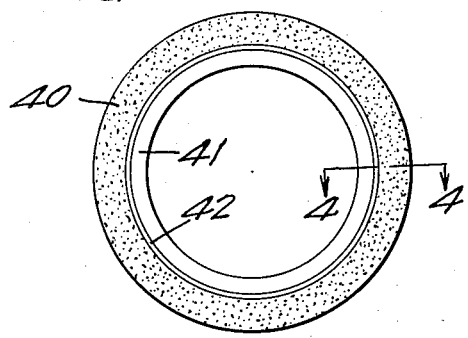
Figure 3 represents an abrasive rim or annulus wherein has been positioned reinforcing fibers.
Figure 4:
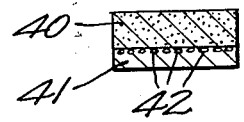
Figure 4 is a cross-sectional view of the rim of Figure 3 taken along the line 4—4.

Abrasive rims are particularly suitable for use in light-duty portable abrading operations due to the maneuverability thereof. For such operations, I prefer a rim having a radial thickness of less than about one-half the center-hole-radius. An example of an abrasive rim is seen upon reference to Figures 3 and 4, wherein the rim has an outer abrasive portion 40 and a radially inner resin layer 41. In this instance reinforcing fibers 42 have been positioned in the inner resin layer 41 in the manner previously described and are distributed against the innermost layer of abrasive particles and extend generally in a circumferential direction. Thus, the article is reinforced against radial cracks and stresses additionally to that reinforcement attained from the inner ring itself. It may thus be subjected to extremely severe operating conditions without cracking and failing.

Several ways may be employed for uniformly adding abrasive grains to the wheel. These include adding the abrasive grains through a narrow feeder tube which oscillates across the width of the mold, or adding the grains under pressure such as by the means employed in the art of sandblasting. Or if a variable speed mold is employed, the mold may be initially slowly rotated while the abrasive grains are added in any manner, thus permitting them to tumble in the mold. Upon the gradual increase of the rotative velocity the grains are caused to be gradually positioned in packed relation within the annular portion of the mold as the centrifugal forces upon the individual grains increase.

To insure the dimensional accuracy and product uniformity described herein, the mold must be rotated at a speed sufficient to cause the mold contents to be positioned and maintained in dynamic equilibrium, i. e. such that increased centrifugal forces cause substantially no change in the position of the contents.

I prefer to employ a mold assembly having a stiff shaft in the instance where slight variances in the rate of addition are likely to occur. The stiff shaft permits rotation of the mold only about the geometric axis thereof. Therefore, should a slightly greater portion of abrasive grains be present momentarily at one portion of the mold than elsewhere due to slight variances in the addition rate of the grains, imbalance results and vibration occurs. The vibrations jostle the grains and cause them to be redistributed uniformly. On the other hand, where a flexible shaft is employed, any imbalance causes the mold to rotate off-center without vibration within the mold; thus the above-mentioned redistribution does not occur and an imbalanced abrasive articles results. However, in either case non-uniform distribution may be corrected, or the correction thereof hastened, by mechanically vibrating the rotating mold while the abrasive grains are still in a loose condition prior to hardening of the resinous binder.

I may use abrasive binder materials which are either in solid or liquid state when added to the mold. A solid binder may be added in granular form either mixed with the abrasive grains or added separately therefrom. After addition the solid binder is liquefied by the addition of heat to the mold, whereupon the dynamic equilibrium position of the contents of the mold is rapidly attained.

Where the application of heat is necessary to liquefy and/or cure the adhesive binder or to accelerate the cure of adhesive binders which slowly autogenously cure, the heat energy may be supplied in any of several ways. For instance, direct heating means may be used, e. g. by applying the flame from a blow torch or other similar direct heating instruments. The heating of the binder may be effected by the positioning of an electric resistance heater in the center of the rotating mold, or by induction heating. Infra-red irradiation may also be used.

Examples of suitable resin binders other than the novel cured epoxide abrasive binder of the specific example include the reaction products of polyhydric alcohols and polybasic acids, aminoplasts, unsaturated polyesters and the like. Whether these materials exist as a liquid or a solid when added to the mold depends on the physical characteristics of the material employed and the temperature of the materials at addition. However, any suitable curable binder which is liquid or which may be liquefied in the mold prior to the cure thereof may be employed in accordance with the methods hereof.

Where a liquid abrasive binder is employed which has a high enough viscosity to form a quasi-suspension of the grains so as to prevent the abrasive grains from quickly settling out when the mix is allowed to stand, such a suspension may be poured directly into the rotating mold without danger of non-uniform grain distribution. In such a case, the mix becomes uniformly distributed over the annular mold surface before the grains are thrown out of suspension by centrifugal forces. Thus the grains are caused to be positioned in a uniform packed relation.

Should the viscosity of the binder adhesive be insufficient to properly suspend the heavier abrasive grains, it may be thickened by suitable fillers and extenders such as titanium dioxide pigment, calcium carbonate powder, or other suitable suspending agents or filler materials. Or the viscosity of many liquid abrasive binders may be increased by decreasing the temperature thereof.

The physical equipment and the position thereof need not be limited to that specifically described. Any suitably shaped rotative mold may be used which defines the dimensions of the abrasive article. Molds may be employed, for instance, which define a cup-shaped abrasive wheel. Since the centrifugal forces created by rotating the mold are many times that of gravity, the rotative axis of the mold may be positioned in any attitude, although such position may be dictated by the desired shape of wheel and the means employed for adding the several components thereof to the mold.

Having now described my invention, it is not my intention to be limited in the scope thereof other than by the scope of the appended claims.

I claim:

1. In a method for making accurately balanced molded rotative abrasive articles, the steps comprising centrifugally fixedly uniformly circumferentially positioning an abrasive mixture including abrasive grains and a resinous abrasive binder in liquid form within a centrifugal mold rapidly rotating at a speed above which no substantial change in position of said mixture will occur, and permanently hardening the binder while maintaining said mixture in said position.

2. The method of claim 1 wherein the abrasive binder is cured by the application of heat.

3. A method for making accurately balanced molded rotative abrasive articles, comprising forming a quasi-suspension of abrasive grains in a relatively viscous liquid curable abrasive binder for bonding said grains, slowly adding said quasi-suspension to a centrifugal mold rapidly rotating about the geometric axis thereof, centrifugally fixedly uniformly circumferentially positioning the constituents within said mold while said mold rotates at a speed above which no substantial change in position of said constituents will occur, and permanently hardening the binder while maintaining said constituents in said position.

4. A method for making accurately balanced molded rotative abrasive articles, comprising slowly uniformly adding a quantity of abrasive grains to a centrifugal mold rapidly rotating about the geometric axis thereof, separately adding to said mold a liquid curable binder for bonding said grains, centrifugally fixedly uniformly circumferentially positioning the constituents within said mold while said mold rotates at a speed above which no substantial change in position of said constituents will occur, and permanently hardening the binder while maintaining said constituents in said position.

5. A method for making accurately balanced molded rotative abrasive articles, comprising slowly uniformly adding to a centrifugal mold rapidly rotating about the geometric axis thereof a quantity of abrasive grains and powdered solid liquefiable curable binder for bonding said grains, liquefying said binder to a flowable state, centrifugally fixedly uniformly circumferentially positioning the constituents within said mold while said mold rotates at a speed above which no substantial change in position of said constituents will occur, and permanently hardening the binder while maintaining said constituents in said position.

6. The method of claim 5 wherein the abrasive binder is liquefied by the application of heat.

7. In a method for making an accurately balanced molded rotative abrasive article having a reinforced radially inner layer devoid of abrasive grains, the steps comprising centrifugally fixedly uniformly circumferentially positioning an abrasive mixture including abrasive grains and excess resinous abrasive binder in liquid form within a centrifugal mold rapidly rotating at a speed above which no substantial change in position of the mold constituents will occur, uniformly adding reinforcing fibers to said rotating mold, and permanently hardening the binder while maintaining said constituents in said position.

8. A self-reinforced circumferentially uniform accurately balanced molded rotative abrasive article comprising a radially outer abrasive ring including abrasive grains uniformly compacted in the radial and axial directions and bonded without substantial porosity therebetween by a hardened resinous binder, and a radially inner reinforcing ring devoid of abrasive grains, said inner ring being firmly integrally joined with said outer ring along the radially outer peripheral surface thereof and being comprised of said binder.

9. A self-reinforced circumferentially uniform accurately balanced molded rotative abrasive article comprising a radially outer abrasive ring including abrasive grains uniformly compacted in the radial and axial directions and bonded without substantial porosity therebetween by a hardened resinous binder, and a radially inner reinforcing ring devoid of abrasive grains, said inner ring being firmly integrally joined with said outer ring along the radially outer peripheral surface thereof and being comprised of said binder and reinforcing fibers substantially uniformly circumferentially positioned within said binder.

10. The article of claim 9 wherein the radial dimension thereof is relatively thin with respect to the diameter.

11. A self-reinforced circumferentially uniform accurately-balanced molded rotative abrasive article comprising a permanently hardened resinous annulus the radially outer portion of which is filled to a relatively substantial radial depth with abrasive grains, said grains being uniformly distributed throughout said outer portion and being densely compacted in the axial and radial directions and being bonded together without substantial porosity therebetween by said resin, the radially inner portion of said annulus, being devoid of said grains, serving to reinforce said article.

References Cited in the file of this patent

UNITED STATES PATENTS

| | | |
|---|---|---|
| 1,826,300 | Chapell | Oct. 6, 1931 |
| 1,960,429 | Anderson | May 29, 1934 |
| 2,157,779 | Vance | May 9, 1939 |
| 2,506,486 | Bender et al. | May 2, 1950 |
| 2,521,911 | Greenlee | Sept. 12, 1950 |
| 2,552,485 | Howard et al. | May 8, 1951 |
| 2,552,954 | Gaines | May 15, 1951 |

UNITED STATES PATENT OFFICE
CERTIFICATE OF CORRECTION

Patent No. 2,862,806            December 2, 1958

Leonard R. Nestor

It is hereby certified that error appears in the printed specification of the above numbered patent requiring correction and that the said Letters Patent should read as corrected below.

Column 2, line 46, for "clamp" read -- clamps --; column 3, line 32, for "are seen" read -- were seen --; line 53, for "procedure" read -- procedures column 4, line 75, before "positioned" insert -- uniformly --.

Signed and sealed this 19th day of May 1959.

(SEAL)

Attest:
KARL H. AXLINE
Attesting Officer

ROBERT C. WATSON
Commissioner of Patents